United States Patent
Grabovac

[15] 3,691,826
[45] Sept. 19, 1972

[54] TORQUE INDICATING TOOL
[72] Inventor: Bosko Grabovac, P.O. Box 1685, Altadena, Calif. 91001
[22] Filed: Aug. 25, 1970
[21] Appl. No.: 66,838

[52] U.S. Cl. ................................................73/139
[51] Int. Cl. ...............................................G01l 5/24
[58] Field of Search ............73/139, 136 A, 1 C, 99; 81/52.4 R, 52.5; 116/115

[56] References Cited

UNITED STATES PATENTS

| | | | |
|---|---|---|---|
| 2,461,491 | 2/1949 | Booth | 73/139 |
| 2,607,219 | 8/1952 | Millard et al. | 73/139 |
| 2,666,324 | 1/1954 | Stott | 73/99 |
| 2,961,771 | 11/1960 | Fronek | 116/115 X |
| 3,142,995 | 8/1964 | Forrest | 116/115 X |

FOREIGN PATENTS OR APPLICATIONS

| | | | |
|---|---|---|---|
| 629,132 | 9/1949 | Great Britain | 73/139 |

Primary Examiner—Charles A. Ruehl
Attorney—Georges A. Maxwell

[57] ABSTRACT

An elongate tool adapted to transmit torsional force applied to one of its ends to a piece of work engaged with its other end and to selectively indicate the foot pounds of force transmitted or to indicate when a preset, predetermined foot pounds of force is being transmitted. Said tool comprising a torsion rod with work force receiving and delivery means at its opposite ends and a work force indicating means responsive to torsional deflection of the rod and comprising a primary dial with a primary scale related to one end of the rod and a secondary dial with a vernier scale related to the other end of the rod and to the primary dial, one of said dials being manually adjustable relative to its related end of the rod and the other dial.

9 Claims, 5 Drawing Figures

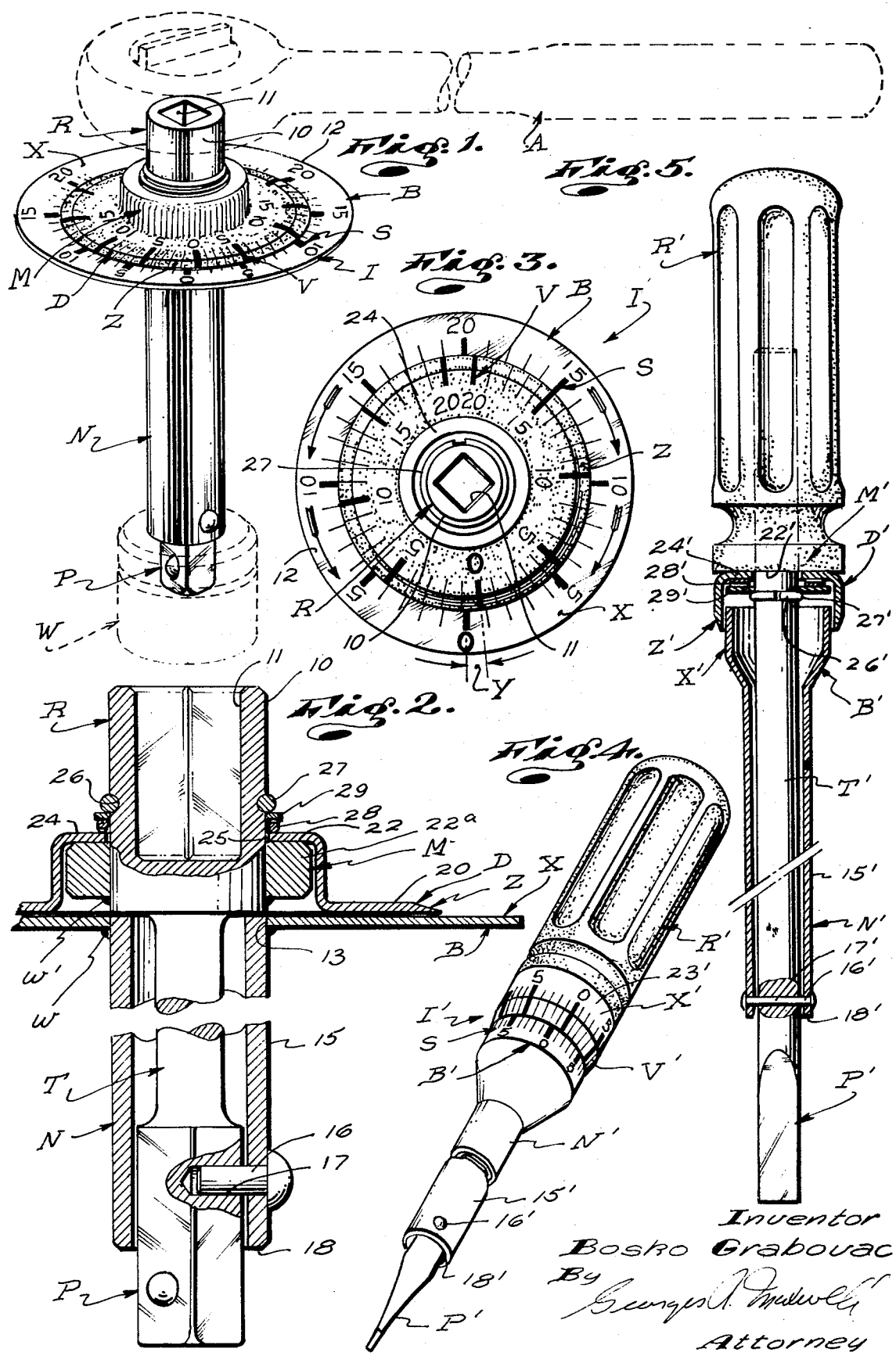

TORQUE INDICATING TOOL

This invention has to do with an improved torque indicating tool and is more particularly concerned with an elongate torque transmitting structure with work force indicating means to indicate the magnitude of torsioned forces transmitted.

In the hand tool industry, there is a special group, type or class of tool commonly referred to as torque tools, which class of tools distinguishes from regular or conventional tools by the addition and/or incorporation of means to indicate or to limit the forces exerted through or by the tools.

Within the above noted class of torque tools, there is provided a number of special elongate tools wherein torsional forces are applied to one end thereof, are transmitted therethrough and are conducted thereby onto or into related work, tool parts or accessories at their other ends. Such tools resemble such standard tools and tool accessories as socket wrench inserts or extensions, screw drivers and the like and would be or are properly defined as torque extensions and torque screw drivers in the art.

Torque extensions and torque screw drivers are but two examples of what might well be described as torque-in, torque-out type tools and are specifically mentioned as it is this type of torque tool with which the instant invention is primarily concerned. More specifically, the instant invention is concerned with that sub-class of torque-in, torque-out type torque tools, such as socket wrench torque extensions and torque screw drivers, which operate to indicate the torsional forces transmitted, as distinguished from that sub-class of such tools which operate to limit the torsional forces applied.

The torque-in, torque-out force indicating class of torque tool provided by the prior art characteristically includes an elongate torque rod, such as the shank of a screw driver, work force receiving means at one end of the torque rod, such as the handle of a screw driver, work force delivery means at the other end of the torque rod, such as the work engaging head of a screw driver, and, torque indicating means related to the rod and/or the work force receiving and delivery means to indicate the torsional forces applied to, conducted through and/or delivered by the structures.

The simplest and most common form of torque indicating means found in such structures consists of a dial arranged in fixed position with one end of the rod and a pointer fixedly related to the other end of the rod and related to the dial, and an appropriate scale on the dial to indicate and show the extent to which the rod is torsionally deflected when the tool is in use. For such a structure to be effective and practical, the rod must be capable of being torsionally deflected a considerable or great extent so that sufficient movement of the pointer relative to the dial and scale can be effected to make accurate reading of such means possible. For example, such rods must be capable of being torsionally deflected as much as 90°. To effect 90°, or any substantial torsional deflection of a torque rod in a tool such as referred to above, the rod must be exceedingly long or must be an exceedingly light and delicate part, of small cross-sectional extent relative to its longitudinal extent, either of which characteristics renders it unsuitable for the establishment of a small, compact, durable and effective torque tool.

The above noted characteristic of torque tools of the class here concerned with and of the torsion rods employed therein has effectively prevented the provision of truly practical, effective and dependable torque-in, torque-out type tools.

Throughout the years, many attempts have been made by the prior art to overcome the above noted difficulties or shortcomings. Such attempts have been characterized by the fabrication of torque transmitting assemblies made up of a plurality of leaf springs or the like, which assemblies are capable of great or considerable torsional deflection relative to their longitudinal extent, provide substantial stability and can be substituted for a simple torsion rod or tube. While such attempts have met with some and limited success, they have proven to be much too costly, fragile and undependable. That success which they have experienced can only be attributed to a long and existing demand and/or necessity for any tool which will serve the end sought to be attained.

Another typical attempt to overcome the above noted difficulties and shortcomings found to exist in torque tools of the class referred to has been to greatly enlarge the scale of the indicating means, to materially increase the swing or sweep of the pointer of said means so as to amplify or magnify the extent of torsion deflection of the torsion rod and to provide a torsion rod which is, in effect, a compromise in length and rigidity from that which is truly desirable and from that which would otherwise be effective. For such attempts to be effective, the dials have had to be made so large and cumbersome that the resulting structures have been practically unacceptable. Further, the employment of a torsion rod, which is a compromise in length and rigidity from that which is desirable and that which would otherwise be required, has resulted in structures which are larger than practicality demands and which are of questionable stability and durability.

An object of my invention is to provide a novel and improved torque transmitting and indicating means and structure which is particularly adaptable and serviceable in the establishment of torque tools of the character referred to above.

An object and feature of this invention is to provide a torque tool having an elongate torsion rod, work force receiving means at one end of the rod, work force delivery means at the other end of the rod and torque indicating means comprising a primary dial in fixed position relative to one end of the rod, and having a primary scale thereon and an auxiliary or secondary dial carried by the other end of the rod end having a vernier scale thereon and cooperatively related with the primary dial and scale.

It is an object and feature of the instant invention to provide a structure of the character referred to above wherein the torque indicating means can effectively and accurately indicate minutes and smaller fractions of degrees of torsional deflection of the rod and translate such deflection into the foot pounds of force required to effect such deflection whereby the rod can be a short, stout, durable and relatively rigid part.

It is an object and feature of my invention to provide a structure of the character referred to wherein the size and extent of the dials which carry the scales can be maintained exceedingly small without major or material sacrifice of accuracy and service ability.

An object and feature of my invention is to provide a structure of the character referred to wherein one of the dials is manually adjustable relative to its related end of the rod and to the other dial whereby the indicating means can be adjusted so that the dials indicate the force applied through the rod when the tool is in use or whereby the indicating means can be adjusted and pre-set to predetermined forces to be applied and so that the dials can be more readily and conveniently read when the tool is employed and said predetermined forces are exerted thereby.

In torque tools of the class here concerned with, and provided in accordance with the teachings of the prior art, the range of force for which such tools are designed is determined and controlled by the physical characteristics of the torsion rod. Accordingly, such tools designed for use in different ranges of force must use specially engineered torque rods and must be specially made.

An object and feature of my invention is to provide a tool structure of the character referred to wherein a single tool structure can be adapted for use in a wide range of force ranges by simply providing one or both of the dials with different and appropriate calibrations or scales.

It is an object and feature of this invention to provide torque indicating tool structures of the character referred to which are such that they can be made small, neat, compact and well within the range of size permitted for conventional non-torque indicating tools of the same or similar basic type, such as socket wrench extensions and screw drivers whereby the tools provided can be advantageously and conveniently employed in substantially all mechanical environments where good mechanical design practices have been followed with respect to the placement and arrangement of parts and elements to which external torsional forces are to be applied by means of hand tools.

An object of my invention is to provide a structure of the character referred to which is extremely easy and economical to mass produce and which is such that it can be advantageously marketed and sold for a fraction of the cost of tools suitable for like purposes and of comparable accuracy which are provided by the prior art.

The above and other objects and features of my invention will be apparent and will be fully understood from the following detailed description of typical forms and embodiments of the invention in which description reference is made to the accompanying drawings, in which:

FIG. 1 is an isometric view of a extension embodying my invention;

FIG. 2 is a longitudinal sectional view of the structure shown in FIG. 1;

FIG. 3 is an elevational top view of the structure shown in FIG. 1;

FIG. 4 is an isometric view of a screw driver embodying the present invention; and, FIG. 5 is a longitudinal sectional view of the structure shown in FIG. 4.

The instant invention embodies a rather simple basic combination and relationship of parts which can be adapted, arranged and/or embodied in a wide variety of tools, tool parts and devices. In FIGS. 1, 2, and 3 of the drawings, the invention is shown related to, or is in the form of, a socket wrench extension, while in FIGS. 4 and 5 of the drawings, it is shown related to, or in the form of, a screw driver.

The basic combination and relationship of parts referred to above and which embodies this invention includes an elongate, resilient torsion rod T with work force receiving means R and work force delivery means P at its opposite ends to receive and to deliver torsional forces transmitted into, through, and by the rod T and force indicating means I carried by and operatively related to the opposite ends of the rod to indicate the torsional forces transmitted by and through the rod. The means I includes an annular or semi-annular primary dial B with a primary scale S in radial spaced relationship about the axis of the rod, support means N securing the dial B in fixed relationship with one end of the rod, an annular or semi-annular secondary auxiliary dial D with a vernier scale V in radial spaced relationship about the axis of the rod and mounting means M supporting the dial D for selective rotation relative to the other end of the rod, in juxtaposition with the primary dial and with the primary and vernier scales S and V in cooperative relationship with each other.

In the first, socket wrench extension, form of my invention, shown in FIGS. 1, 2 and 3 of the drawings, the torsion rod T is a simple, elongate, vertical stem or shank of predetermined longitudinal and cross-sectional extent and having a predetermined modulus of elasticity.

The upper end of the rod carries the work force receiving means R, which means is shown as an enlarged female box formed integrally on the rod and having a cylindrical exterior 10 and an axially upwardly opening polygonal socket 11 to cooperatively receive a polygonal drive pin (not shown) on a wrench lever arm or the like. Such a wrench lever arm is shown in phantom lines at A in FIG. 1 of the drawings.

The lower end of the rod carries the work force delivery means P, which means is shown as an enlarged, elongate, axially extending drive pin, polygonal in cross-section and adapted to be cooperatively engaged in the drive opening of a wrench socket, as illustrated at W in FIG. 1 of the drawings.

The structure thus far described is a typical or conventional socket wrench extension and in practice a standard extension can be utilized in establishing the foregoing parts and means of the instant invention.

In the form of the invention shown in FIGS. 4 and 5 of the drawings, the rod T' is established by the elongate, vertical shank of a conventional screw driver structure. The work force receiving means R' is defined by the enlarged handle of the screw driver construction fixed to the upper end of the shank or rod T'. The work force delivery means D' is defined by the flattened, narrow, straight-edged, screw driving head formed on the lower end of the rod T'.

The force indicating means I in the first form of the invention includes a flat, horizontally disposed, round, disc-shaped plate 12 with a central opening 13 and defining an axially upwardly disposed primary dial or dial face B. The outer peripheral position X of dial B is provided with two primary scales S, each extending 180° about opposite segments of the dial face B.

The support means N for the plate 12 or dial B includes an elongate, vertically extending support tube 15 with upper and lower ends. The upper end of the tube is engaged in the opening 13 in the primary dial face plate 12 and is fixed thereto by welding w.

The tube 15 is sufficiently large in inside diametric extent or dimensions to freely receive the enlarged drive pin P at the lower end of the rod T and is slightly greater in longitudinal extent than the rod. The tube 15 is shifted axially upwardly about the drive pin P and rod T and has its lower end fixed to the drive pin P against relative axial and rotary shifting and/or displacement.

In the case illustrated, the tube 15 of the means N is fixed to the drive pin P by a retaining or keeper pin 16 carried by the tube and engaged in an opening 17 established in the drive pin P.

The lower terminal end 18 of the tube 15 is spaced a sufficient distance above the lower end of the drive pin P so that a sufficient portion of the pin is exposed and accessible to effect engaging said pin with wrench sockets and the like, in accordance with practice and normal use of wrench extensions.

The upper end of the tube 15 terminates clear of and immediately below the lower end of the female drive box of the work force receiving means R and the dial plate 12 projects radially outwardly from the tube 15, in close proximity to the means R.

The secondary dial D of the means I is established by a flat, horizontally disposed, round, disc-shaped plate 20. The plate 20 is smaller in diametric extent than the plate 12 and has a lower surface 21 which opposes and overlies the inner annular portion of the plate 15, leaving the above noted outer portion X of the plate 15 and the scales S thereon, unobstructed. The plate 20 occurs in close, clear running relationship and in axial alignment with the plate 12.

The outer peripheral portion of the plate 20, defining the dial D, is preferably beveled and inclined radially outwardly and downwardly as indicated at Z and is provided with two vernier scales V, each extending less than 180° about opposite segmental portions of the dial D. The calibration lines of the scales V extend to the outer peripheral edge of the dial D and said outer edge of the dial occurs about the line on the dial B on which the inner ends of the calibration lines of the scales S terminate.

Tapering of the dial D, as shown at Z, reduces parallax error between the related scales, when the indicating means is read.

The mounting means M provided to mount the dial D for rotation relative to the dial B and the rod T is shown as including a flat, annular, upwardly disposed stop shoulder 22 on and about the exterior 10 of the box of the means R. The shoulder 22 is shown established by a ring 22a fixed to the box as by welding w'.

The means M next includes an upwardly projecting, downwardly opening central cup formed in the plate 20. The cup is greater in inside diameter than the ring 22a and has a flat radially extending top wall 24 with a central opening 25. The opening 25 freely receives the box of the means R and the wall 24 establishes flat, frictional bearing and supporting engagement on the shoulder 22.

The means M next includes a snap ring groove 26 about the exterior 10 of the box in spaced relationship above the wall 24, a snap ring 27 engaged in and projecting radially outward from the groove and an annular, axially resilient, marcel-type ring 28, or the equivalent thereof, between the outer portion of the snap ring 27 and the wall 24 and normally yieldingly urging the wall 24 downwardly into pressure frictional engagement with the shoulder 22 and holding the dial D in predetermined axial spaced relationship with the dial B.

In practice, if necessary or desired, a back-up washer 29 can be engaged between the rings 27 and 28.

The exterior of the cup is preferably scored or grooved and provides a finger engaging knob-like part to facilitate manual rotation of the dial D relative to the dial B.

With the structure described, it will be apparent that the dial B is fixed relative to the lower end of the rod T, the dial D is selectively, manually rotatable relative to the upper end of the rod T and that the dial D and B are related one to the other so that the scales S and V thereon are arranged and disposed for cooperative reading and adjustment.

The indicating means I' in the second form of the invention is similar to the means I just described, with minor alteration and re-arranging of certain of the parts and/or portions thereof.

In the second form of the invention, the stop shoulder 22' of the means M' is disposed downwardly and is defined by the lower end of the means R', which is in the form of an enlarged screw driver handle. The wall 24' of the cup 23' is held in frictional engagement with the shoulder 22' by means of a marcel washer or ring 28' below the wall 24'. A back-up washer 29' is arranged below the rings 28' and a snap ring 27' is engaged below the washer 29'. The ring 27' is engaged in a groove 26' established in the rod T', at its upper end.

The dial D' is an annular radially outwardly disposed dial established by the lower end portion or an extension of the cup 23'. The lower portion of D' is beveled or tapered radially inwardly and downwardly as at Z' and is provided with two circumferentially extending vernier scales V' about its opposite sides and extending less than 180°.

The means I' next includes an elongate, tubular, primary dial B', the outside diameter of which is less than the inside diameter of the bell 23' and/or auxiliary dial D'. The dial B' has an upper portion occuring within the cup 23' for free relative rotation therein and an outer, lower portion X' projecting downwardly from the cup or dial D' and on which the primary scales S' are established. The scales S' extend 180° about opposite sides of the dial B'.

The dial B' is carried by support means N' which means includes an elongate carrier tube 15' freely engaged about and extending longitudinally of the rod T'. The lower end 18' of the tube 15' is fixed to the lower end of the rod T' by a pin 16' carried by the tube and engaged in an opening 17' in the rod.

The tube 15' is smaller in diameter than tubular dial B' and can be fixed with the dial in any suitable manner. In the case illustrated, the dial B' and tube 15' are formed integrally with each other, the dial being in the nature of an enlarged bell-like extension on the upper end of the tube 15'.

It will be noted that the first and second forms of the invention are essentially alike. The major distinctions between the two noted forms of the invention reside in the fact that the dials in the first form of the invention are large in diameter and are disposed axially while the dials in the second form of the invention are disposed radially and are relatively small in diameter. In practice, the radially disposed dial means in the second form of the invention and the axially disposed dial means in the first form of the invention could be substituted one for the other in the respective forms of the invention without departing from the spirit of this invention.

The distinctions between the means R and P and the means R' and P' of the first and second forms of the invention clearly illustrate and make apparent the fact that the form of such means is subject to wide variation, without departing from the spirit of the invention.

The vernier scales V and V' and the primary scales S and S' in each form of the invention are cooperatively related so that when the tools are in use and the rods T and T' are subjected to torsional deflection, between their ends, slight deflection is readily detectable by observation or reading of the scales.

Unlike tools of a similar nature provided by the prior art, wherein the indicating means shows total torsional deflection of the rods directly on the dials and where torquing the rods to as much as 180° is required to effect a full range of operation, in both clockwise and counter-clockwise directions, the provision and use of the auxiliary dials with vernier scales V and V' makes possible the effective reading and accurate determination of forces applied on and through the rods D and D' when they are torsionally deflected to a small or minor extent, for example, 3° or 6°, or in more extreme cases, to as much as 10° or 15°.

The above makes possible the establishment of tools with relatively short torsion rods and of relatively limited overall longitudinal extent, without sacrificing strength, rigidity and durability.

The above also makes possible the provision of tools capable and adapted to indicate widely different ranges of force by the provision of dials with differing primary and/or secondary or vernier scales, without otherwise varying or modifying the basic tool structure in any manner.

The two, left and right, primary scales S and S' of my invention preferably extend a full 180°, both commencing at a common zero point or mark at one side of their common dial and extending counter-clockwise and clockwise about their respective halves of the dial, to the other or opposite side of said dial. In the case illustrated in FIG. 3 of the drawings, the primary scales S extend 180° from 0 to 20. Each scale S is divided into 5 primary calibrations, 0, 5, 10, 15 and 20. The spaces between the primary calibrations are divided in 5 segments and provides 4 secondary calibrations.

The primary calibrations 0, 5, 10, 15, and 20 can, for example, indicate 0 to 20, or 0 to 200 foot pounds of force.

The two, left and right auxiliary or vernier scales V or V' of my invention extend less than 180° and are less in circumferential extent than their related primary scales by a predetermined extent.

The vernier scales V and V' preferably start or commence at a common 0 point or mark at one side of their related secondary dial and extend counterclockwise and clockwise toward, but terminate short of the other or opposite side of said dial. The vernier scales are divided and calibrated similar to the primary scales, for example and as illustrated in FIG. 3, they are divided in primary fifths, 0, 5, 10, 15, and 20 and the spaces between the primary calibrations are divided into fifths by 4, intermediate, secondary calibrations.

The relative circumferential extent of the related primary and secondary scales that I provide is subject to considerable and wide variation and is determined by the physical characteristics of the torque rods and the range of forces that is to be determined and read, or indicated.

In practice and with the structure provided, the force indicating means I or I' can be used and read in two distinct manners.

The first manner is to read forces directly, that is, to read the amount of force exerted onto a piece of work by means of the tool without reference to some pre-set amount of force.

To effect direct reading, the secondary or auxiliary dial is rotated so that the zero calibrations of both the primary and verier scales are aligned. When the zero calibrations are thus aligned, torque is applied to a piece of work, through the torque rod. If a desired amount is to be applied, such is determined when the appropriate calibrations on the appropriate vernier scale is aligned with the corresponding calibrating on the related primary scale. For example, and referring to FIG. 3 of the drawings, when No. 15 calibration of the appropriate vernier scale is aligned with the No. 15 calibration on the related primary scale, the force applied is, for example, 150 foot pounds.

In FIG. 3 of the drawings, the calibrations No. 15 at the upper right hand quarter of the dials are in register. If such register of the scales was effected by torquing the structure from a set position where the zero calibrations were in normal register, it would indicate that the work was torqued in a counter-clockwise direction and 150 foot pounds of force was applied thereto. The torque rod in the example given deflected to the extend noted by the arrows at the lower side of the noted figure of the drawings.

It will be noted that with the dials set in the above manner, a piece of work can be torqued as desired and the dials can be read and note made of the extent to which the work was torqued, in foot pounds of force, or any other suitable and desired measure.

The second manner in which the indicating means can be employed is to pre-set the dials to the force which is to be applied to a piece of work. This is effected by manually rotating the auxiliary dial to shift an appropriate, vernier scale so that the calibration thereof indicating the force to be applied to the work registers with the corresponding calibration on the related primary scale. For example, and as shown in FIG. 3, if a clockwise force of 150 foot pounds to be applied to the work, the right hand scales are adjusted so that 15 and 15 are in normal register. The zero marks are therefore normally out of register a predetermined extent. Upon applying force onto the work, it is determinable that 150 foot pounds of force is applied when the two related zero calibrations are brought into register with each other.

It is to be noted that the right hand scales in FIG. 3 of the drawings are employed when direct reading of counter-clockwise forces are to be obtained and when the structure is pre-set to indicate clockwise forces and that the left hand scales are employed when direct reading of clockwise forces are to be obtained and when the structure is pre-set to indicate counter-clockwise forces. To assist the operator of the tool in determining which scale would be read in each of the noted uses of the indicating means, appropriate arrows can be related to each set of scales to indicate when that set of scales is to be read, for direct or pre-set readings and to indicate the direction in which torque is to be applied. The noted arrows, as shown in FIG. 3 of the drawings, can be designated by the letters -D- and -S- to indicate that they point to the direction of applied force for direct and pre-set readings on the scales with which they are related.

Having described only typical preferred forms and applications of my invention, I do not wish to be limited or restricted to the specific details herein set forth, but wish to reserve to myself any modifications and/or variations that may appear to those skilled in the art.

Having described my invention, I claim:

1. An elongate torque tool comprising an elongate unitary torsion rod having a work force receiving end and a work force delivery end and work force indicating means comprising a primary dial with a primary scale, the calibrations of which extend circumferentially about the axis of the rod in radial spaced relationship thereabout support means between the primary dial and one end of the rod, a secondary dial with a Vernier scale cooperatively related to the primary dial and scale and mounting means between the secondary dial and the other end of the rod, said Vernier scale is shiftable relative to the primary scale upon torsional deflection of the rod between its ends and indicates deflection of the rod corresponding to a fraction of the distance between the calibration lines of said primary scale and indicates the foot pounds of force applied to effect such deflection of the rod.

2. A structure as set forth in claim 1 wherein one of said dials and scales is in fixed position relative to its related end of the rod and the other dial and scale is shiftable circumferentially relative to said one dial and scale whereby said dials can be manually set to foot pounds of force to be applied and said force is applied when said dials zero out.

3. A structure as set forth in claim 2 wherein said dials are flat, radially extending concentric discs of different outside diametric extent and define axially disposed faces on which the scales are established.

4. A structure as set forth in claim 2 wherein said dials are concentric freely telescopically engaged cylindrical parts defining axially spaced radially outwardly disposed surfaces on which the scales are established.

5. A structure as set forth in claim 2 wherein the primary and secondary dials are provided with two primary and two Vernier scales extending about the dials in opposite directions to selectively indicate clockwise and counter-clockwise torsional deflection of the rod.

6. A structure as set forth in claim 2 wherein the work force receiving end of the rod has a female box with an axially outwardly opening polygonal pin receiving socket and said work force delivery end of the rod has an axially extending elongate polygonal drive pin.

7. A structure as set forth in claim 2 wherein the work force receiving end of the rod has an enlarged, elongate, axially extending handle and said work force delivery end of the rod has a work engaging head.

8. A structure as set forth in claim 2 wherein the support means includes an elongate support tube surrounding and extending longitudinally of the rod, a keeper pin securing one end of the tube to said one end of the rod and means securing the primary dial to the other end of the tube, said mounting means including an axially disposed annular shoulder on the rod adjacent said other end of the rod, a radially disposed wall on the secondary dial and retaining means yieldingly urging the said wall into frictional bearing engagement on said shoulder.

9. A structure as set forth in claim 8 wherein the work force receiving end of the rod has an enlarged, elongate axially extending handle and said work force delivery end of the rod has a work engaging head, said retaining means including a groove in the rod spaced axially from the shoulder, a snap ring engaged in the groove and an axially resilient spring ring engaged between the snap ring and the wall and urging the wall toward the shoulder.

* * * * *